United States Patent
Liang et al.

(10) Patent No.: US 12,531,801 B2
(45) Date of Patent: Jan. 20, 2026

(54) ROUTING INFORMATION TRANSMISSION METHOD AND APPARATUS

(71) Applicant: Huawei Technologies Co., Ltd., Shenzhen (CN)

(72) Inventors: Yanrong Liang, Shenzhen (CN); Guoqi Xu, Beijing (CN); Yuxiao Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 18/187,425

(22) Filed: Mar. 21, 2023

(65) Prior Publication Data
US 2023/0224236 A1 Jul. 13, 2023

Related U.S. Application Data

(63) Continuation of application No. PCT/CN2021/119207, filed on Sep. 18, 2021.

(30) Foreign Application Priority Data

Sep. 23, 2020 (CN) .................. 202011008166.X

(51) Int. Cl.
*H04L 45/02* (2022.01)
(52) U.S. Cl.
CPC .................. *H04L 45/04* (2013.01)
(58) Field of Classification Search
CPC ..................................... H04L 45/04
USPC ........................................... 370/389
See application file for complete search history.

(56) References Cited

U.S. PATENT DOCUMENTS

| | | | |
|---|---|---|---|
| 11,165,689 B2* | 11/2021 | Zhang | H04W 72/23 |
| 2016/0301668 A1 | 10/2016 | Marquardt et al. | |
| 2019/0124704 A1* | 4/2019 | Sun | H04L 47/24 |
| 2021/0083940 A1* | 3/2021 | Peng | H04L 41/0894 |
| 2021/0377125 A1* | 12/2021 | Zheng | H04L 41/40 |
| 2022/0014394 A1 | 1/2022 | Zhao et al. | |
| 2022/0045944 A1 | 2/2022 | Sun et al. | |
| 2022/0052945 A1* | 2/2022 | Peng | H04W 40/02 |

FOREIGN PATENT DOCUMENTS

| | | |
|---|---|---|
| CN | 106572517 A | 4/2017 |
| CN | 110912795 A | 3/2020 |
| CN | 111224874 A | 6/2020 |
| CN | 111385207 A | 7/2020 |
| JP | 2011211710 A | 10/2011 |
| WO | 2017215401 A1 | 12/2017 |

* cited by examiner

*Primary Examiner* — Faisal Choudhury
(74) *Attorney, Agent, or Firm* — Conley Rose, P.C.

(57) ABSTRACT

A routing information transmission method includes before forwarding a service traffic packet, a first network device receives first Border Gateway Protocol (BGP) routing information from a second network device to determine a first forwarding table entry based on a service identifier and an identifier of a first network slice that are in the first BGP routing information. The first forwarding table entry indicates to forward, to the second network device using the first network slice, the service traffic. When receiving the service traffic packet corresponding to the service identifier, the first network device determines the first network slice based on the first forwarding table entry, and then sends the service traffic to the second network device using the first network slice.

20 Claims, 6 Drawing Sheets

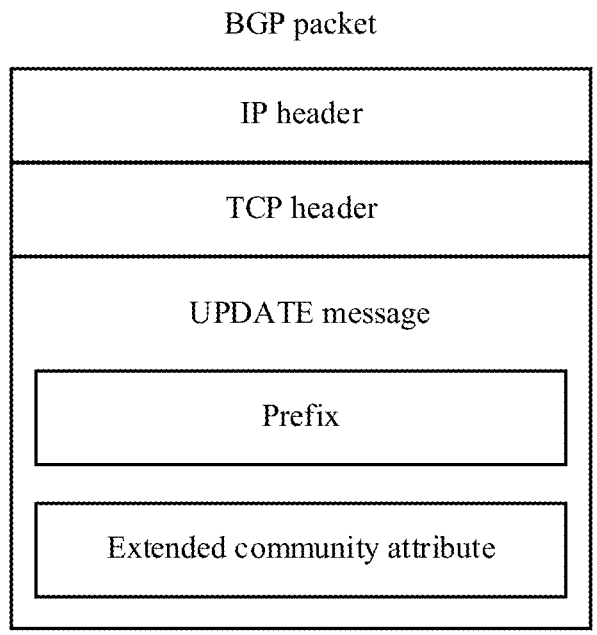
FIG. 3A
FIG. 3B
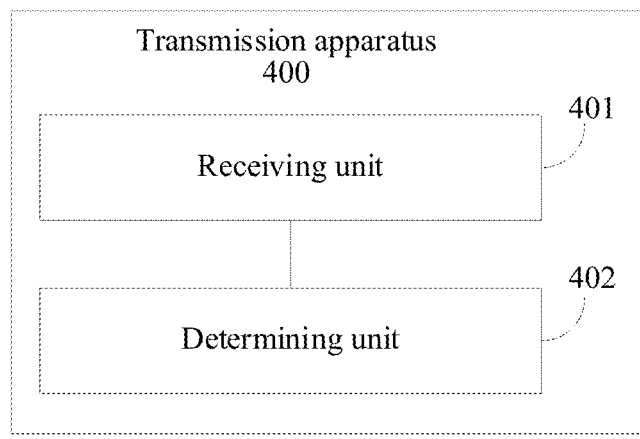
FIG. 4

ROUTING INFORMATION TRANSMISSION METHOD AND APPARATUS

CROSS-REFERENCE TO RELATED APPLICATIONS

This application is a continuation application of International Patent Application No. PCT/CN2021/119207 filed on Sep. 18, 2021, which claims priority to Chinese Patent Application No. 202011008166.X filed on Sep. 23, 2020. The disclosures of the aforementioned applications are hereby incorporated by reference in their entireties.

TECHNICAL FIELD

This application relates to the field of communication technologies, and in particular, to a routing information transmission method and apparatus.

BACKGROUND

In a fifth generation (5G) network era, a mobile network no longer serves only mobile phones, but various types of devices such as mobile phones, tablets, fixed sensors, and vehicles. There are also diversified scenarios for application of the mobile network such as mobile broadband, a large-scale internet, and a mission-critical internet. To meet requirements in different application scenarios, a network slicing technology emerges. Essentially, network slicing is to divide a physical network of a carrier into a plurality of virtual networks. The virtual networks are obtained through division based on different service requirements, such as a latency, a bandwidth, security, and reliability, to flexibly respond to different network application scenarios. However, how to allocate different services to network slices that can meet service requirements of the different services for forwarding is an urgent technical problem to be resolved.

SUMMARY

Embodiments of this application provide a routing information transmission method and apparatus, to resolve a problem that different service traffic is forwarded by using network slices that meet service requirements of the different service traffic.

A first aspect of embodiments of this application provides a routing information transmission method. The method includes a first network device that receives first Border Gateway Protocol (BGP) routing information sent by a second network device, where the first BGP routing information includes a service identifier and an identifier of a first network slice, and the first network device is located in the first network slice, and the first network device determines a first forwarding table entry based on the first BGP routing information, where the first forwarding table entry is used to forward, to the second network device by using the first network slice, service traffic corresponding to the service identifier. In this embodiment, before sending the service traffic to the second network device, the first network device receives the first BGP routing information sent by the second network device. The first BGP routing information includes the service identifier and the identifier of the first network slice. The first network device determines the first forwarding table entry based on the first BGP routing information. The first forwarding table entry is used to forward, to the second network device by using the first network slice, the service traffic corresponding to the service identifier, so that the first network device can forward the service traffic based on the first forwarding table entry, to meet a service requirement corresponding to the forwarding of the service traffic.

In a possible implementation, the first network device and the second network device belong to a same network domain, and that the first network device determines a first forwarding table entry based on the first BGP routing information includes that the first network device generates the first forwarding table entry based on the service identifier and the identifier of the first network slice. In this implementation, when receiving the first BGP routing information, the first network device generates the first forwarding table entry based on the service identifier and the identifier of the first network slice in the first BGP routing information to indicate to forward, via the first forwarding table entry, the service traffic corresponding to the service identifier.

In a possible implementation, the first network device and the second network device belong to a same network domain, and the method further includes that the first network device determines an identifier of a second network slice based on the identifier of the first network slice and a correspondence, where the correspondence includes a correspondence between the identifier of the first network slice and the identifier of the second network slice, and the first network device sends second BGP routing information to a third network device, where the second BGP routing information includes the service identifier and the identifier of the second network slice, to enable the third network device to determine a second forwarding table entry based on the second BGP routing information, the second forwarding table entry is used to forward the service traffic to the first network device by using the second network slice, the third network device and the second network device belong to different network domains, and the third network device is located in the second network slice.

In this implementation, when there is a third network device, and the third network device and the second network device belong to different network domains, a correspondence that is configured by the second network device and that is between a service identifier and an identifier of a network slice may be different from a correspondence that is configured by the third network device and that is between a service identifier and an identifier of a network slice. In this case, before the first network device sends, to the third network device, the first BGP routing information sent by the second network device, the first network device may determine the second network slice based on the identifier of the first network slice and the correspondence between the identifier of the first network slice and the identifier of the second network slice. The third network device is located in the second network slice. The first network device sends the second BGP routing information to the third network device. The second BGP routing information includes the service identifier and the identifier of the second network slice, so that the third network device can determine the second forwarding table entry based on the second BGP routing information. The second forwarding table entry is used to forward the service traffic to the first network device by using the second network slice.

In a possible implementation, the method further includes that the first network device sends the service traffic to the second network device via the first forwarding table entry by using the first network slice. After the first network device determines the first forwarding table entry based on the first BGP routing information, when the first network device has the service traffic corresponding to the service identifier, the first network device may send the service traffic to the second network device via the first forwarding table entry by using the first network slice.

In a possible implementation, the method further includes, after determining the first forwarding table entry, the first network device may establish a correspondence between the service identifier and the first forwarding table entry, and store the correspondence in a local forwarding table. When obtaining the service traffic corresponding to the service identifier, the first network device may determine the first forwarding table entry based on the service identifier and the correspondence.

In a possible implementation, the first forwarding table entry includes the identifier of the first network slice. In this implementation, the first forwarding table entry may include the identifier of the first network slice, so that the first network device can determine the first network slice based on the identifier of the first network slice, and then send the service traffic to the second network device by using the first network slice.

In a possible implementation, the service identifier is a virtual private network identifier, and the virtual private network identifier is used to identify a virtual private network of a network device corresponding to a destination address of the service traffic, or the service identifier is a prefix, and the prefix is a prefix of a network device corresponding to a destination address of the service traffic. In this implementation, the service identifier may be set based on the divided virtual private network, different service identifiers correspond to different virtual private network identifiers, and different virtual private networks may transmit different service traffic for users. Alternatively, the service identifier is a prefix, and the prefix is a prefix of a network device corresponding to a destination address of the service traffic, so that different prefixes are used to correspond to service traffic of users on different network segments.

In a possible implementation, the identifier of the first network slice is located in an extended community attribute of the first BGP routing information. In this implementation, the identifier of the first network slice may be added by adding a new attribute to the extended community attribute in the first BGP routing information.

A second aspect of embodiments of this application provides a routing information transmission method. The method includes a second network device that obtains first BGP routing information, where the first BGP routing information includes a service identifier and an identifier of a first network slice, and the second network device sends the first BGP routing information to a first network device in the first network slice, to enable the first network device to forward, to the second network device by using the first network slice, service traffic corresponding to the service identifier. In this embodiment, the second network device may obtain the first BGP routing information. The first BGP routing information includes the service identifier and the identifier of the first network slice. In addition, the second network device sends the first BGP routing information to the first network device located in the first network slice. In this way, the first network device may determine the first network slice based on the first BGP routing information and send, to the second network device by using the first network slice, the service traffic corresponding to the service identifier.

In a possible implementation, that a second network device obtains first BGP routing information includes that the second network device generates the first BGP routing information based on a correspondence between the service identifier and the identifier of the first network slice. In this implementation, the second network device may generate the first BGP routing information based on the correspondence between the service identifier and the identifier of the first network slice.

In a possible implementation, the correspondence between the service identifier and the identifier of the first network slice is configured on the second network device, or the correspondence between the service identifier and the identifier of the first network slice is obtained by the first network device based on interior gateway protocol (IGP) routing information. In this implementation, the correspondence between the service identifier and the identifier of the first network slice may be preconfigured on the second network device, or may be determined by the second network device based on the IGP routing information.

A third aspect of embodiments of this application provides a routing information transmission apparatus. The apparatus includes a receiving unit configured to receive first BGP routing information sent by a second network device, where the first BGP routing information includes a service identifier and an identifier of a first network slice, and the first network device is located in the first network slice, and a determining unit configured to determine a first forwarding table entry based on the first BGP routing information, where the first forwarding table entry is used to forward, to the second network device by using the first network slice, service traffic corresponding to the service identifier.

In a possible implementation, a network device in which the apparatus is located and the second network device belong to a same network domain, and the determining unit is further configured to generate the first forwarding table entry based on the service identifier and the identifier of the first network slice.

In a possible implementation, the first network device and the second network device belong to a same network domain, and the apparatus further includes a sending unit. The determining unit is further configured to determine an identifier of a second network slice based on the identifier of the first network slice and a correspondence, where the correspondence includes a correspondence between the identifier of the first network slice and the identifier of the second network slice. The sending unit is configured to send second BGP routing information to a third network device, where the second BGP routing information includes the service identifier and the identifier of the second network slice, to enable the third network device to determine a second forwarding table entry based on the second BGP routing information. The second forwarding table entry is used to forward the service traffic to the apparatus by using the second network slice, the third network device and the second network device belong to different network domains, and the third network device is located in the second network slice.

In a possible implementation, the apparatus further includes the sending unit, where the sending unit is configured to send the service traffic to the second network device via the first forwarding table entry by using the first network slice.

In a possible implementation, the first forwarding table entry includes the identifier of the first network slice.

In a possible implementation, the service identifier is a virtual private network identifier, and the virtual private network identifier is used to identify a virtual private network of a network device corresponding to a destination address of the service traffic, or the service identifier is a prefix, and the prefix is a prefix of a network device corresponding to a destination address of the service traffic.

In a possible implementation, the identifier of the first network slice is located in an extended community attribute of the first BGP routing information.

A fourth aspect of embodiments of this application provides a routing information transmission apparatus. The apparatus includes an obtaining unit configured to obtain first BGP routing information, where the first BGP routing information includes a service identifier and an identifier of a first network slice, and a sending unit configured to send the first BGP routing information to a first network device in the first network slice, to enable the first network device to forward, by using the first network slice to a network device in which the apparatus is located, service traffic corresponding to the service identifier.

In a possible implementation, the obtaining unit is further configured to generate the first BGP routing information based on a correspondence between the service identifier and the identifier of the first network slice.

In a possible implementation, the correspondence between the service identifier and the identifier of the first network slice is configured on the second network device, or the correspondence between the service identifier and the identifier of the first network slice is obtained by the first network device based on IGP routing information.

A fifth aspect of embodiments of this application provides a communication device, where the device includes a processor and a memory. The memory is configured to store instructions or a computer program, and the processor is configured to execute the instructions or the computer program in the memory, to enable the communication device to perform the method according to the first aspect or the second aspect.

A sixth aspect of embodiments of this application provides a computer-readable storage medium, including instructions or a computer program. When the instructions or the computer program is run on a computer, the computer is enabled to perform the method according to the first aspect or the second aspect.

A seventh aspect of embodiments of this application provides a network system, including a first network device and a second network device. The first network device includes the routing information transmission apparatus according to the third aspect, and the second network device includes the routing information transmission apparatus according to the fourth aspect. Alternatively, the network system includes the communication device according to the fifth aspect.

According to technical solutions provided in embodiments of this application, before forwarding a service traffic packet, a first network device receives first BGP routing information sent by a second network device, to determine a first forwarding table entry based on a service identifier and an identifier of a first network slice that are in the first BGP routing information. The first forwarding table entry indicates to forward, to the second network device by using the first network slice, the service traffic corresponding to the service identifier. When receiving the service traffic packet corresponding to the service identifier, the first network device determines the first network slice based on the first forwarding table entry, and then sends the service traffic to the second network device by using the first network slice. In other words, a forwarding table entry is determined between network devices by sending BGP routing information that includes an identifier of a network slice and a service identifier, so that the forwarding table entry can be used to determine the network slice used for forwarding the service traffic, to meet a service forwarding requirement.

BRIEF DESCRIPTION OF DRAWINGS

To describe the technical solutions in some embodiments of this application more clearly, the following briefly introduces the accompanying drawings used in embodiments. It is clear that the accompanying drawings in the following description show merely some embodiments recorded in this application. Persons of ordinary skill in the art may still derive other drawings from these accompanying drawings without creative efforts.

FIG. 3A is a schematic structural diagram of a packet according to an embodiment of this application;

FIG. 3B is a schematic structural diagram of a newly added attribute according to an embodiment of this application;

FIG. 4 is a structural diagram of a routing information transmission apparatus according to an embodiment of this application;

DESCRIPTION OF EMBODIMENTS

To make persons skilled in the art better understand solutions in the present disclosure, the following clearly and completely describes the technical solutions in embodiments of the present disclosure with reference to the accompanying drawings in embodiments of the present disclosure. It is clear that the described embodiments are merely a part rather than all of embodiments of the present disclosure.

For ease of understanding, the following first describes network elements and terms that are provided in embodiments of this application.

Figure 1A:
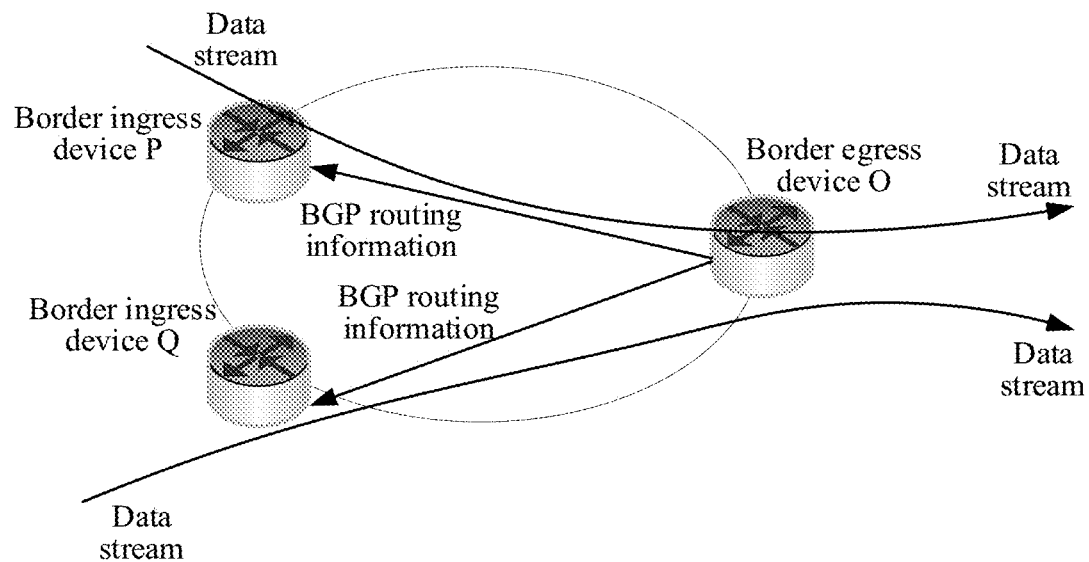
FIG. 1A is a schematic diagram of an application scenario according to an embodiment of this application.
Figure 1B:
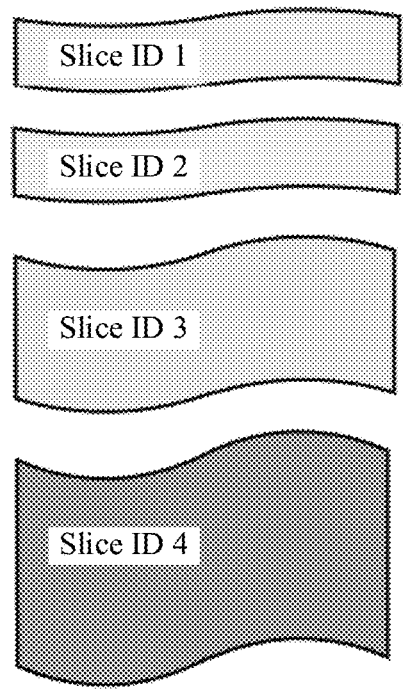
FIG. 1B is a schematic diagram of a network slice according to an embodiment of this application.

Refer to a schematic diagram of a network system architecture shown in FIG. 1A. In this figure, descriptions are provided by using an example in which the network system architecture includes one border egress device and two border ingress devices, where the three devices are respectively a border egress device O, a border ingress device P, and a border ingress device Q. Network slicing refers to slicing basic network resources between neighboring network devices based on user requirements and allocating the resources to users. The user requirements include a latency, a bandwidth, and the like. FIG. 1B is a schematic diagram of a network slice. A total bandwidth resource reserved by a border egress device O is 40 gigahertz (G). For example, four network slices may be divided, where a bandwidth reserved for a network slice identifier (ID) 1 is 5 G, a bandwidth reserved for a network slice ID 2 is 5 G, a bandwidth reserved for a network slice ID 3 is 10 G, and a bandwidth reserved for a network slice ID 4 is 20 G. In other words, the border egress device has four network slices, and different network slices may be used to transmit service traffic (data streams) with different bandwidth requirements. Further, network slicing may include soft slicing and hard slicing. Soft slicing refers to performing partial isolation between different users, but incomplete isolation is performed. Hard slicing refers to performing strong isolation between different users. From the perspective of service experience, a user can use as many network resources as the network resources that are allocated to the user.

A border egress device is a device on a border of a network slice. Service traffic transmitted in the network slice leaves the network slice at the border egress device and continues to be forwarded to another network domain. The border egress device may send, to a border ingress device, BGP routing information that includes network slice information, where the BGP routing information may include a service identifier and an identifier of the network slice. For example, if the BGP routing information sent by the border egress device O to the border ingress device P includes a service identifier 2 and a network slice identifier slice ID 1, it indicates that the border ingress device P may use a network slice corresponding to the slice ID 1 to send, to the border egress device, service traffic corresponding to a service identifier 1. The border egress device may send the BGP routing information to the corresponding border ingress device based on information about the network slice divided by the border egress device, to implement unified planning of service traffic transmission by using the BGP routing information without separately configuring transmission information, and further reduce a configuration amount.

A border ingress device is a device on a border of a network slice. Service traffic enters, at the border ingress device, the network slice for transmission. The border ingress device may learn of, by using the BGP routing information, the network slice information corresponding to the border egress device, determine a forwarding table entry based on the received BGP routing information, and forward, to the border egress device by using a network slice indicated by the forwarding table entry, service traffic corresponding to a service identifier sent by a source network device.

Figure 1C:
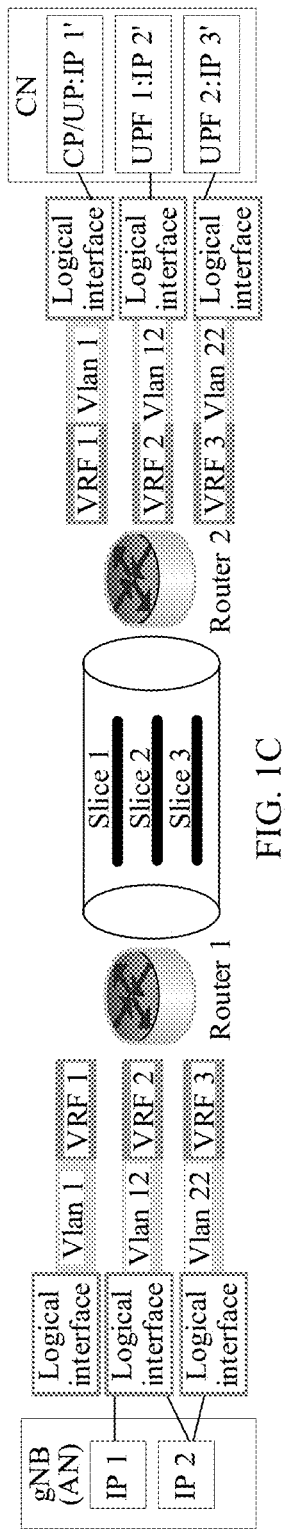
FIG. 1C is a schematic diagram of another application scenario according to an embodiment of this application.

Refer to a schematic diagram of an application scenario shown in FIG. 1C. The application scenario includes two network devices a network device router 1 and a network device router 2. The router 1 is a border ingress device, and the router 2 is a border egress device. Three virtual local area networks (VLANs) may be divided for each of the router 1 and the router 2, where the three virtual local area networks are respectively a vlan 1, a vlan 12, and a vlan 22. Different VLANs may correspond to different virtual private network (VPN) instances, namely, virtual routing and forwarding (VRF) tables, to correspond to network slices via the VRF. For example, as shown in FIG. 1C, the router 2 corresponds to three network slices. The vlan 1 corresponds to a VRF 1, and the VRF 1 corresponds to a network slice 1. The vlan 12 corresponds to a VRF 2, and the VRF 2 corresponds to a network slice 2. The vlan 22 corresponds to a VRF 3, and the VRF 3 corresponds to a network slice 3.

Different VLANs may provide, through different logical interfaces, services for users located in different Internet Protocol (IP) network segments. For example, in FIG. 1C, the VLAN 1 in the router 1 provides a service for a user on an IP1 network segment through a logical interface. The VLAN 12 provides a service for a user on an IP2 network segment through a logical interface. The VLAN 22 provides a service for a user on the IP2 network segment through a logical interface.

Figure 1D:
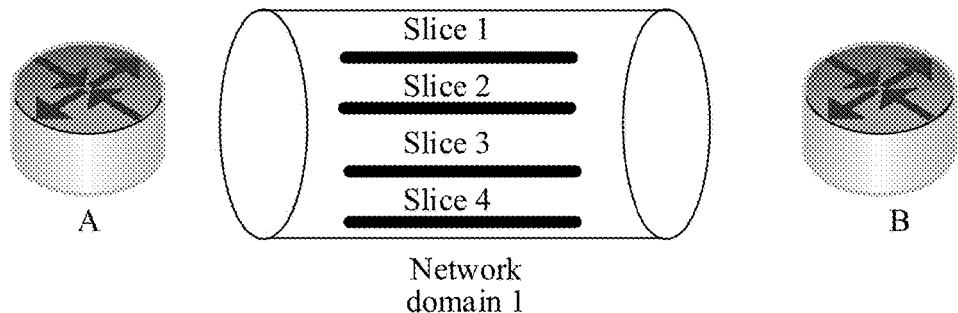
FIG. 1D is a schematic diagram of still another application scenario according to an embodiment of this application.

In FIG. 1D, an example in which a forwarding path of service traffic relates to one network domain is used for description. In FIG. 1D, the network domain may include a plurality of network devices. The network device is a device that provides routing and forwarding functions in a network system. For example, the network device may be a router, a switch, or a label switching router (LSR). FIG. 1D includes a network device A and a network device B. The network device A may be a border ingress device, and the network device B may be a border egress device. For example, the network device A may be the router 1 in FIG. 1C, and the network device B may be the router 2 in FIG. 1C. The network device B has four network slices: a network slice 1, a network slice 2, a network slice 3, and a network slice 4. The four network slices may correspond to different bandwidth resources, to transmit service traffic with different bandwidth requirements. For example, the network device B configures the network slice 1 to be used to transmit service traffic corresponding to a service identifier 1, the network slice 2 to be used to transmit service traffic corresponding to a service identifier 2, the network slice 3 to be used to transmit service traffic corresponding to a service identifier 4, and the network slice 4 to be used to transmit service traffic corresponding to a service identifier 3. The network device B sends, to the network device A, BGP routing information that includes a service identifier and a network slice identifier, to indicate the network slice used when the network device A sends, to the network device B, service traffic corresponding to the service identifier.

It should be noted that one or more intermediate forwarding devices may exist between the border ingress device (for example, the network device A) and the border egress device (for example, the network device B). Network slice division may be performed between the border egress device and the intermediate forwarding device, and network slice division may be performed between the intermediate forwarding device and the border ingress device. When the border egress device, the border ingress device, and the intermediate forwarding device belong to a same network domain, for example, a same autonomous system (AS) domain, a network slice situation between the border egress device and the intermediate forwarding device may be the same as a network slice situation between the intermediate forwarding device and the border ingress device. For example, quantities of network slices obtained through division may be the same, and bandwidth resources corresponding to the network slices may be the same.

Figure 1E:
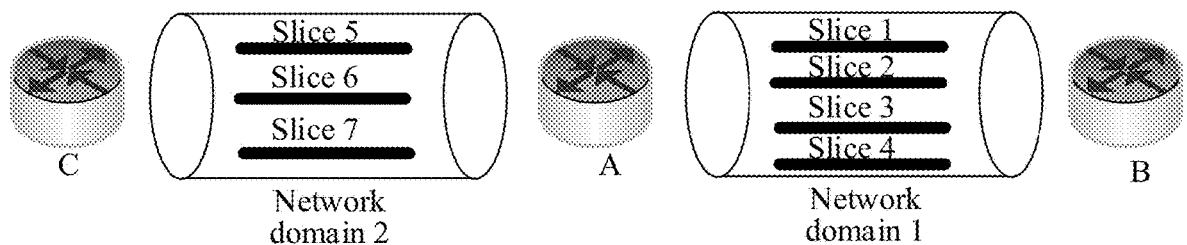
FIG. 1E is a schematic diagram of still another application scenario according to an embodiment of this application.

Refer to an embodiment of an application scenario shown in FIG. 1E. In FIG. 1E, an example in which a forwarding path of service traffic relates to at least two network domains is used as an example for description. Compared with FIG. 1D, in FIG. 1E, a network device A may be connected not only to a network domain 1, but also to a network domain 2. In this case, a network device B is a border egress device in the network domain 1, and the network device A is a border ingress device in the network domain 1. The network device A is used as a border egress device in the network domain 2, and a network device C is a border ingress device in the network domain 2. There may be only one network device A used as a relay device. In this case, the network device A belongs to two network domains at the same time. Alternatively, there may be at least two network devices A such as a network device A1 and a network device A2. The network device A1 belongs to the network domain 1, and the network device A2 belongs to the network domain 2. A network slice division situation between the network device B and the network device A may be different from a network slice division situation between the network device A and the network device C. That the division situations are different may include that quantities of network slices obtained through division in the two network domains are different, or bandwidths corresponding to the network slices obtained through division are different. For example, as shown in FIG. 1E, four network slices are divided between the network device B and the network device A, where the four network slices are respectively a slice 1, a slice 2, a slice 3, and a slice 4. Three network slices are divided between the network device A and the network device C, where the three network slices are respectively a slice 5, a slice 6, and a slice 7. Network slice division situations corresponding to border egress devices belonging to different network domains may be planned based on actual requirements. This is not limited in this embodiment.

Figure 2:
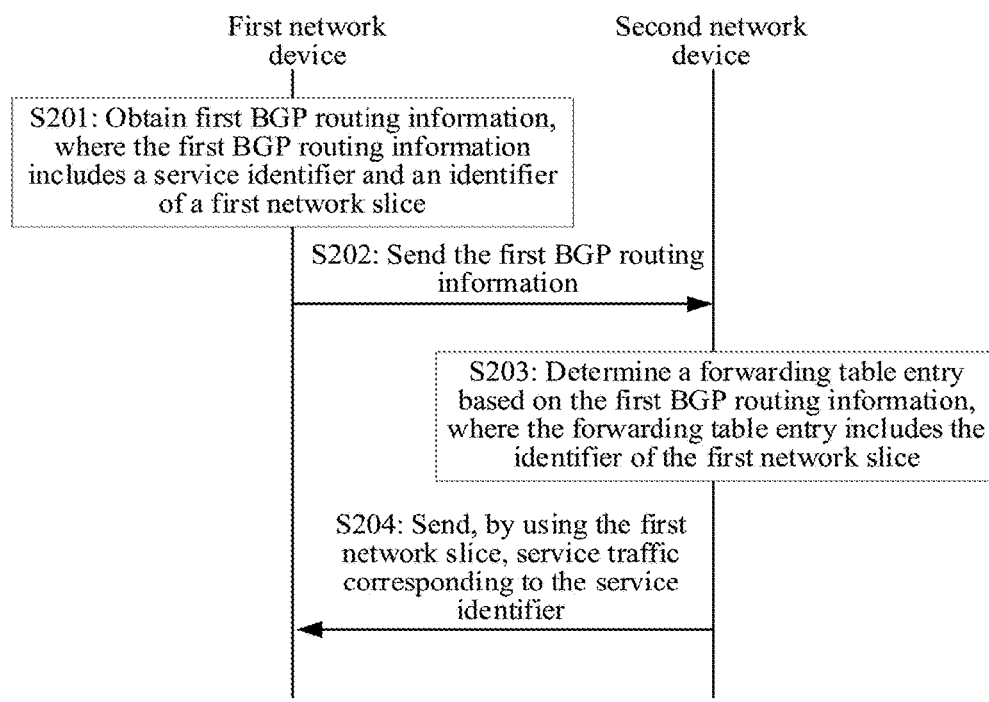
FIG. 2 is a flowchart of a routing information transmission method according to an embodiment of this application.

For ease of understanding of a routing information transmission method provided in embodiments of this application, the following describes a routing transmission procedure by using the network system structures shown in FIG. 1D and FIG. 1E as an example. FIG. 2 is a flowchart of a routing information transmission method according to an embodiment of this application. As shown in FIG. 2, the method includes the following steps.

S201: A second network device obtains first BGP routing information, where the first BGP routing information includes a service identifier and an identifier of a first network slice.

In this embodiment, the second network device is used as a network device, for example, the network device B in FIG. 1D or FIG. 1E or the network device A in FIG. 1E, to obtain BGP routing information. First, the second network device obtains the first BGP routing information, where the first BGP routing information includes the service identifier and the identifier of the first network slice. The first BGP routing information indicates that the first network slice is to be used to forward service traffic corresponding to the service identifier. The service identifier may indicate service traffic with different service level agreement (SLA) requirements. The SLA requirement may be a bandwidth, a latency, a jitter rate, or the like. A correspondence between the service identifier and the service traffic may be determined based on a service type. For example, service types such as a video, audio, and a text correspond to different service identifiers. Alternatively, the correspondence may be determined based on a user. For example, different user groups correspond to different service identifiers. In a case, the service identifier may be a VPN identifier, in other words, different VPNs may transmit different service traffic. The virtual private network identifier is used to identify a virtual private network of a network device corresponding to a destination address of the service traffic. For example, as shown in FIG. 1C, the router 2 has three VPN instances. The vlan 1 corresponds to a VPN 1, the vlan 12 corresponds to a VPN 2, and the vlan 22 corresponds to a VPN 3. In this case, the service identifier may be any one of the VPN instances. In another case, the service identifier may be a prefix, and the prefix is a prefix of a network device corresponding to a destination address of the service traffic.

In some specific implementations, a manner of obtaining the first BGP routing information by the second network device may include that the second network device obtains a correspondence between the service identifier and the identifier of the first network slice, and generates the first BGP routing information based on the correspondence between the service identifier and the identifier of the first network slice. The second network device may obtain the correspondence between the service identifier and the identifier of the first network slice in the following manners. In one manner, the correspondence between the service identifier and the identifier of the first network slice is directly configured on the second network device, and the second network device reads the correspondence from local configuration. In another manner, the second network device obtains the correspondence between the service identifier and the identifier of the first network slice according to a local configuration policy, where the local configuration policy includes the correspondence between the service identifier and the identifier of the first network slice. The configuration policy may be manually configured by a user on the second network device based on service traffic that needs to be sent, or may be obtained by the second network device from an external device such as a controller. According to the configuration policy, a network slice may be planned based on a VPN. For example, the VPN 1 corresponds to a network slice 1, the VPN 2 corresponds to a network slice 3, and the VPN 3 corresponds to a network slice 4. Alternatively, according to the configuration policy, a network slice may be planned based on an IP network segment. For example, a network segment 1 corresponds to a network slice 4, and another network segment corresponds to a network slice 3. In still another manner, the second network device obtains the correspondence between the service identifier and the identifier of the first network device based on IGP routing information, where the IGP routing information includes the correspondence between the service identifier and the identifier of the first network slice.

The BGP routing information is carried in a BGP packet. The BGP packet may include an IP header, a Transmission Control Protocol (TCP) header, an UPDATE message, and the like. A format of the BGP packet is shown in FIG. 3A. The UPDATE message may include information such as a prefix and an extended community attribute. The identifier of the first network slice may be located in an extended community attribute of the first BGP routing information. A specific representation form may be defined by using type-length-value (TLV) in the extended community attribute. As shown in FIG. 3B, a Type field indicates a type of the extended community attribute, a Length field indicates a quantity of bytes, for example, 8 bytes, included in a Value field, and the Value field indicates the identifier of the first network slice.

S202: The second network device sends the first BGP routing information to the first network device.

After obtaining the first BGP routing information, the second network device may forward the first BGP routing information to a next-hop network device, namely, the first network device, located in the first network slice. When a network system has one network domain, as shown in FIG. 1D, the second network device is the network device B, and the first network device may be the border ingress device A. When a network system has a plurality of network domains, as shown in FIG. 1E, when the second network device is the network device B, the first network device is the network device A, or when the second network device is the network device A, the first network device is the network device C.

S203: The first network device determines a first forwarding table entry based on the first BGP routing information.

After receiving the first BGP routing information sent by the second network device, the first network device may determine the first forwarding table entry based on the first BGP routing information. The first forwarding table entry indicates to forward, to the second network device by using the first network slice, the service traffic corresponding to the service identifier. The first forwarding table entry stores the identifier of the first network slice, and the first network device is located in the first network slice. In other words, the first network device may identify the identifier of the first network slice.

Further, when the first network device and the second network device belong to a same network domain, after receiving the first BGP routing information, the first network device generates the first forwarding table entry based on the service identifier and the identifier of the first network slice that are in the first BGP routing information, that is, establishes a mapping relationship between the service identifier and the identifier of the first network slice. After determining the first forwarding table entry based on the first BGP routing information, the first network device may establish a correspondence between the service identifier and the first forwarding table entry, and store the correspondence in a forwarding table of the first network device. In this way, the first network device may implement subsequent service traffic forwarding based on the forwarding table.

After determining the first forwarding table entry, the first network device may perform different processing in different application scenarios. Further, the following operations may be included.

In a case, after determining the first forwarding table entry based on the first BGP routing information, the first network device no longer forwards the first BGP routing information. For example, this case exists when the first network device has no other neighboring network devices, or when the first network device is a device connected to user equipment.

In another case, when the first network device has another neighboring network device (for example, a third network device) except the second network device, to ensure that the third network device can identify a network slice used during service traffic forwarding, the first network device sends first BGP routing information to the third network device, so that the third network device can determine a corresponding forwarding table entry based on the first BGP routing information. In this case, when the first network device, the third network device, and the second network device all belong to a same network domain, service traffic corresponding to a same service identifier in the network domain may be forwarded by using a same network slice. In this case, the first network device may directly forward the first BGP routing information to the third network device. For specific implementation of determining, by the third network device, the first forwarding table entry based on the first BGP routing information, refer to the detailed descriptions of determining, by the first network device, the first forwarding table entry based on the first BGP routing information.

It should be noted that, to reflect transmission continuity of routing information (for example, the first BGP routing information mentioned above), in this embodiment of this application, both the first BGP routing information sent by the second network device to the first network device and the first BGP routing information sent by the first network device to the third network device are referred to as first BGP routing information. However, it may be understood that the first BGP routing information sent by the second network device to the first network device is different from the first BGP routing information sent by the first network device to the third network device in an actual application scenario. For example, information such as time to live (TTL) and next-hop network devices may be different. To be specific, when the first network device forwards, to the third network device, the first BGP routing information sent by the second network device, the first BGP routing information may actually be updated first BGP routing information in which some necessary information is modified.

When the third network device and the second network device belong to different network domains, different network slices may be configured for same service traffic in different network domains. To ensure that the third network device can establish a correct forwarding table entry based on the received BGP routing information, when sending the BGP routing information to the third network device, the first network device first determines an identifier of a second network slice based on the identifier of the first network slice in the first BGP routing information and a correspondence. The identifier of the first network slice is applied to a network domain to which the second network device belongs, and the identifier of the second network slice is applied to a network domain to which the third network device belongs. The correspondence includes a correspondence between the identifier of the first network slice and the identifier of the second network slice. The correspondence may be manually configured by a user on the first network device based on an actual application requirement, or may be obtained by the first network device from the controller. The first network device updates the identifier of the first network slice in the first BGP routing information by using the identifier of the second network slice, obtains second BGP routing information, and sends the second BGP routing information to the third network device. After receiving the second BGP routing information, the third network device may determine a second forwarding table entry based on a service identifier and the identifier of the second network slice that are in the second BGP routing information. The second forwarding table entry indicates to forward, to the first network device by using the second network slice, service traffic corresponding to the service identifier. The second forwarding table entry includes the identifier of the second network slice, and the second network device is located in the second network slice. In other words, the second network device may identify the identifier of the second network slice. For example, as shown in FIG. 1E, the network device B belongs to the network domain 1, and service traffic corresponding to a service identifier in the network domain 1 is defined to be forwarded by using the network slice 1. The network device C belongs to the network domain 2, and service traffic corresponding to a service identifier in the network domain 2 is defined to be forwarded by using the network slice 5. In this case, when receiving first BGP routing information sent by the network device B, the network device A may determine the network slice 5 based on the network slice 1 in the first BGP routing information and a correspondence between the network slice 1 and the network slice 5 in the network domain 2, and update the network slice 1 in the first BGP routing information by using the network slice 5, to obtain second BGP routing information. The network device A sends the second BGP routing information to the network device C. For specific implementation of determining, by the third network device, the second forwarding table entry based on the second BGP routing information, refer to the detailed descriptions of determining, by the first network device, the first forwarding table entry based on the first BGP routing information.

Further, when the third network device and the second network device belong to different network domains, different service identifiers may be set for same service traffic in different network domains. To ensure that the third network device can identify a service identifier in BGP routing information, the third network device may obtain, based on a service identifier that may be used in a current network domain and that is carried in first BGP routing information, a service identifier used in another network domain. The service identifier used in the other network may be referred to as an updated service identifier. The first network device may replace a service identifier in second BGP routing information with an updated service identifier, to send, to the third network device, second BGP routing information that carries the updated service identifier and the identifier of the second network slice. In this way, the third network device may identify the updated service identifier and the identifier of the second network slice that are in the second BGP routing information, and then determine a second forwarding table entry. The second forwarding table entry includes the identifier of the second network slice. The network domain may be an AS domain, a management domain, or the like. For example, the management domain may include a plurality of AS domains, and the plurality of AS domains are uniformly managed by the controller. For specific implementation of determining, by the third network device, the second forwarding table entry based on the second BGP routing information, refer to the detailed descriptions of determining, by the first network device, the first forwarding table entry based on the first BGP routing information.

For a packet format corresponding to the second BGP routing information, refer to the BGP packet shown in FIG. 3A. The identifier of the second network slice may be located in an extended community attribute of the second BGP routing information. A specific representation form may be defined by using TLV in the extended community attribute. As shown in FIG. 3B, a Type field indicates a type of the extended community attribute, a Length field indicates a quantity of bytes, for example, 8 bytes, included in a Value field, and the Value field indicates the identifier of the second network slice.

The foregoing cases are merely used as specific examples. It may be understood that the first network device may alternatively perform a specific proper operation with reference to another actual application scenario. For example, although the third network device and the second network device belong to different network domains, if network devices in different network domains predetermine a same service identifier and/or a same network slice identifier by using a mechanism such as negotiation, the first network device may alternatively not update the service identifier and/or the network slice identifier when performing cross-domain forwarding.

S204: The first network device sends, to the second network device via the first forwarding table entry by using the first network slice, the service traffic corresponding to the service identifier.

In this embodiment, when obtaining the service traffic corresponding to the service identifier, the first network device may determine, based on the service identifier and a correspondence in a stored forwarding table, the first forwarding table entry corresponding to the service identifier. The first network device forwards the service traffic to the second network device by using the first network slice included in the first forwarding table entry.

The first network device may obtain the service traffic in the following manners. In one manner, the first network device is used as a border ingress device to receive service traffic sent by a source network device. In another manner, when the first network device is an intermediate forwarding device, the first network device may receive service traffic sent by a previous-hop network device (for example, the third network device). In this case, the previous-hop network device (the third network device) may send the service traffic to the first network device based on a network slice indicated by a forwarding table entry corresponding to the previous-hop network device. When the third network device and the second network device belong to a same network domain, the third network device sends the service traffic to the first network device by using the first network slice, and the first network device sends the service traffic to the second network slice by using the first network slice.

When the third network device and the second network device belong to different network domains, the third network device sends the service traffic to the first network device by using the second network slice, and the first network device sends the service traffic to the second network device by using the first network slice. In this case, when obtaining the service traffic, the third network device may determine the second forwarding table entry based on the service identifier corresponding to the service traffic and the correspondence in the stored forwarding table, and send the service traffic to the first network device by using the second network slice in the second forwarding table entry. When receiving the service traffic sent by the third network device, the first network device may determine the first forwarding table entry based on the service identifier corresponding to the service traffic and the correspondence in the stored forwarding table, and send the service traffic to the second network device by using the first network slice in the first forwarding table entry.

During actual application, there may be a plurality of corresponding border egress devices. In this case, each border egress device may send corresponding BGP routing information to a border ingress device. The border ingress device may select, according to a policy or based on a priority configured by the border ingress device, a destination border egress device, and determine a forwarding table entry based on BGP routing information sent by the destination border egress device. When obtaining service traffic, the border ingress device may forward the service traffic to the destination border egress device based on a network slice corresponding to the forwarding table entry.

Based on the foregoing method embodiments, an embodiment of this application further provides a routing information transmission apparatus. The following describes the apparatus with reference to the accompanying drawings.

FIG. 4 is a schematic structural diagram of a routing information transmission apparatus according to an embodiment of this application. The apparatus 400 may be used in a first network device, and perform a function of the first network device in the embodiment shown in FIG. 2. The apparatus 400 may include a receiving unit 401 and a determining unit 402.

The receiving unit 401 is configured to receive first BGP routing information sent by a second network device, where the first BGP routing information includes a service identifier and an identifier of a first network slice, and the first network device is located in the first network slice. For specific implementation of the receiving unit 401, refer to the detailed description of S202 in the embodiment shown in FIG. 2.

The determining unit 402 is configured to determine a first forwarding table entry based on the first BGP routing information, where the first forwarding table entry is used to forward, to the second network device by using the first network slice, service traffic corresponding to the service identifier. For specific implementation of the determining unit 402, refer to the detailed description of S203 in the embodiment shown in FIG. 2.

In a specific implementation, a network device in which the apparatus is located and the second network device belong to a same network domain, and the determining unit 402 is further configured to generate the first forwarding table entry based on the service identifier and the identifier of the first network slice. For specific implementation of the determining unit 402, refer to the detailed description of S203 in the embodiment shown in FIG. 2.

In a specific implementation, the first network device and the second network device belong to a same network domain, and the apparatus further includes a sending unit (not shown in FIG. 4).

The determining unit 402 is further configured to determine an identifier of a second network slice based on the identifier of the first network slice and a correspondence, where the correspondence includes a correspondence between the identifier of the first network slice and the identifier of the second network slice.

The sending unit is configured to send second BGP routing information to a third network device, where the second BGP routing information includes the service identifier and the identifier of the second network slice, to enable the third network device to determine a second forwarding table entry based on the second BGP routing information. The second forwarding table entry is used to forward the service traffic to the apparatus by using the second network slice, the third network device and the second network device belong to different network domains, and the third network device is located in the second network slice.

For specific implementation of determining the identifier of the second network slice by the determining unit 402 and sending the second BGP routing information by the sending unit, refer to the detailed description of S203 in the embodiment shown in FIG. 2.

In a specific implementation, the apparatus further includes the sending unit (not shown in FIG. 4).

The sending unit is configured to send the service traffic to the second network device via the first forwarding table entry by using the first network slice. For specific implementation of the sending unit, refer to the detailed description of S204 in the embodiment shown in FIG. 2.

In a specific implementation, the first forwarding table entry includes the identifier of the first network slice.

In a specific implementation, the service identifier is a virtual private network identifier, and the virtual private network identifier is used to identify a virtual private network of a network device corresponding to a destination address of the service traffic, or the service identifier is a prefix, and the prefix is a prefix of a network device corresponding to a destination address of the service traffic. For a specific representation form of the service identifier, refer to the related description of S201 in the embodiment shown in FIG. 2.

In a specific implementation, the identifier of the first network slice is located in an extended community attribute of the first BGP routing information.

For specific executable functions and implementation of the transmission apparatus 400, refer to the corresponding description of the first network device in the embodiment shown in FIG. 2. Details are not described herein again.

Figure 5:
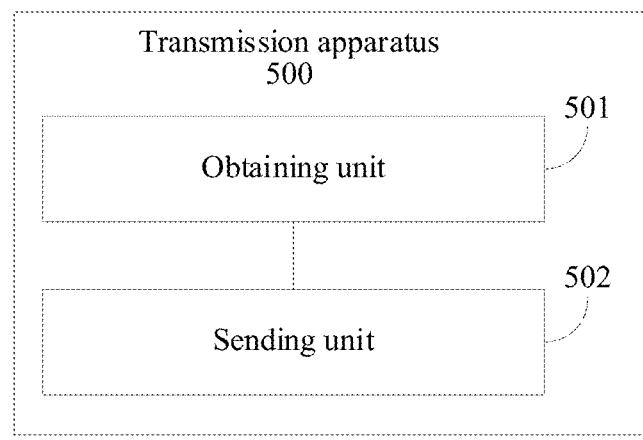
FIG. 5 is a structural diagram of another routing information transmission apparatus according to an embodiment of this application.

FIG. 5 is a schematic structural diagram of another routing information transmission apparatus according to an embodiment of this application. The apparatus 500 may be used in a second network device, and perform a function of the second network device shown in FIG. 2. The apparatus includes an obtaining unit 501 and a sending unit 502.

The obtaining unit 501 is configured to obtain first BGP routing information, where the first BGP routing information includes a service identifier and an identifier of a first network slice. For specific implementation of the obtaining unit 501, refer to the related description of S201 in the embodiment shown in FIG. 2.

The sending unit 502 is configured to send the first BGP routing information to a first network device in the first network slice, to enable the first network device to forward, by using the first network slice to a network device in which the apparatus is located, service traffic corresponding to the service identifier. For specific implementation of the sending unit 502, refer to the related description of S202 in the embodiment shown in FIG. 2.

In a possible implementation, the obtaining unit 501 is further configured to generate the first BGP routing information based on a correspondence between the service identifier and the identifier of the first network slice. For specific implementation of the obtaining unit 501, refer to the related description of S202 in the embodiment shown in FIG. 2.

In a possible implementation, the correspondence between the service identifier and the identifier of the first network slice is configured on the second network device, or the correspondence between the service identifier and the identifier of the first network slice is obtained by the first network device based on IGP routing information. For specific implementation of obtaining the correspondence by the second network device, refer to the related description of S201 in the embodiment shown in FIG. 2.

For specific executable functions and implementation of the transmission apparatus 500, refer to the corresponding description of the second network device in the embodiment shown in FIG. 2. Details are not described herein again.

Figure 6:
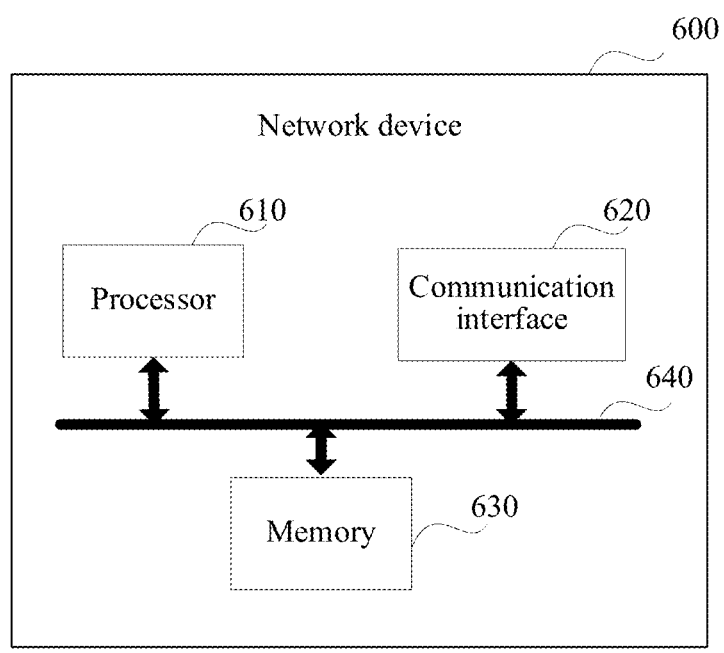
FIG. 6 is a schematic structural diagram of a network device according to an embodiment of this application.

FIG. 6 is a schematic structural diagram of a network device according to an embodiment of this application. The network device may be, for example, the first network device, the second network device, or the third network device in the embodiment shown in FIG. 2, or may be the routing transmission apparatus 400 in the embodiment shown in FIG. 4 and the routing transmission apparatus 500 in the embodiment shown in FIG. 5.

Refer to FIG. 6. The network device 600 includes a processor 610, a communication interface 620, and a memory 630. There may be one or more processors 610 in a packet forwarding device 600. One processor in FIG. 6 is used as an example. In this embodiment of this application, the processor 610, the communication interface 620, and the memory 630 may be connected by using a bus system or in another manner. In FIG. 6, for example, a bus system 640 is used for connection.

The processor 610 may be a central processing unit (CPU), a network processor (NP), or a combination of the CPU and the NP. The processor 610 may further include a hardware chip. The foregoing hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

The communication interface 620 is configured to receive and send BGP routing information or service traffic. Further, the communication interface 620 may include a receiving interface and a sending interface. The receiving interface may be configured to receive the BGP routing information or the service traffic, and the sending interface may be configured to send the BGP routing information or the service traffic. There may be one or more communication interfaces 620.

The memory 630 may include a volatile memory, for example, a random-access memory (RAM). Alternatively, the memory 630 may include a non-volatile memory, for example, a flash memory, a hard disk drive (HDD), or a solid-state drive (SSD). The memory 630 may alternatively include a combination of the foregoing types of memories. For example, the memory 630 may store the correspondence between the service identifier and the forwarding table entry.

Optionally, the memory 630 stores an operating system, a program, an executable module, or a data structure, a subset thereof, or an extended set thereof. The program may include various operation instructions to implement various operations. The operating system may include various system programs to implement various basic services and process hardware-based tasks. The processor 610 may read the program in the memory 630, to implement the routing information transmission method provided in embodiments of this application.

The memory 630 may be a storage device in the network device 600, or may be a storage apparatus independent of the network device 600.

The bus system 640 may be a Peripheral Component Interconnect (PCI) bus, an Extended Industry Standard Architecture (EISA) bus, or the like. The bus system 640 may be divided into an address bus, a data bus, a control bus, and the like. For ease of representation, only one thick line is for representing the bus in FIG. 6, but this does not mean that there is only one bus or only one type of bus.

Figure 7:
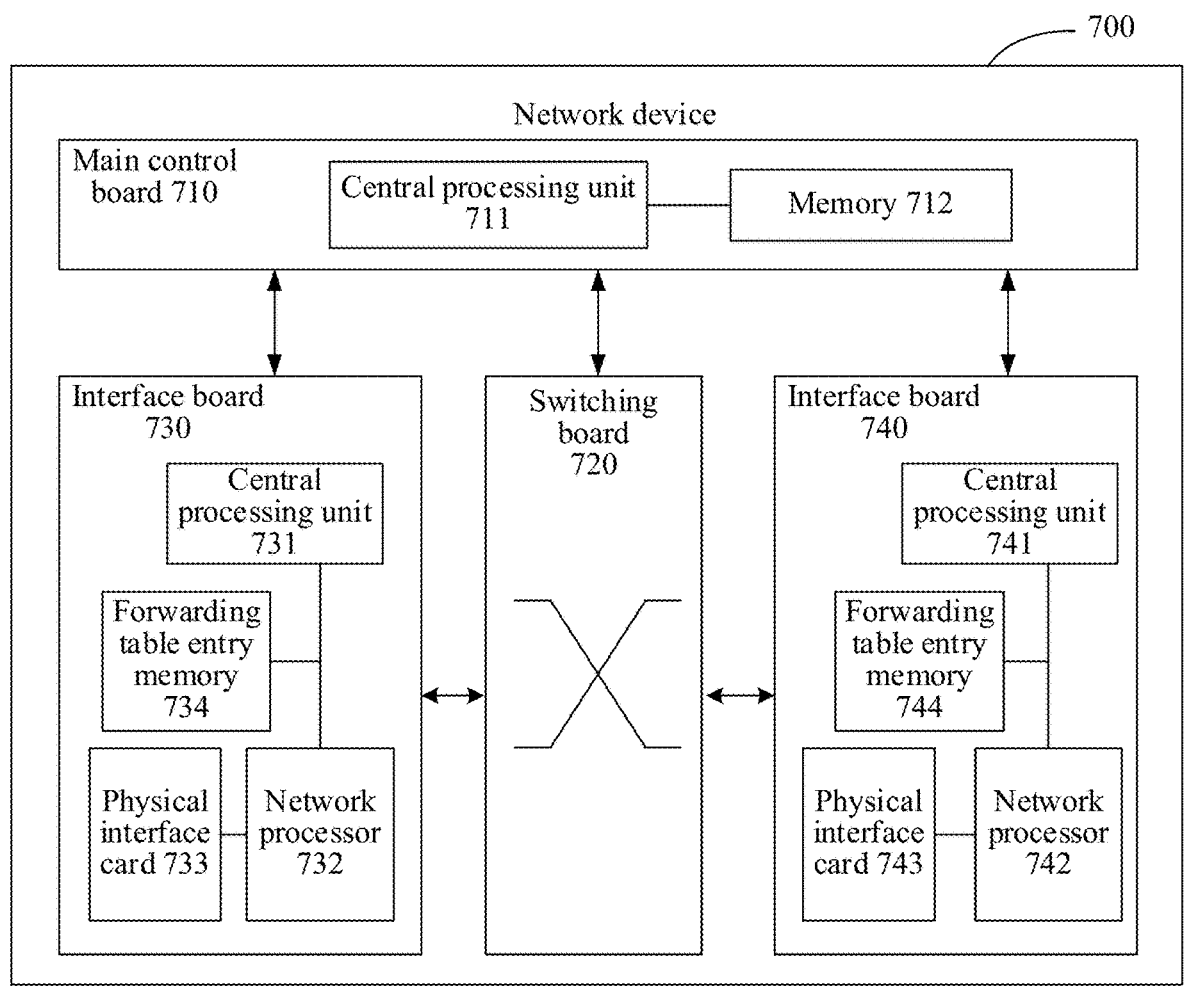
FIG. 7 is a schematic structural diagram of another network device according to an embodiment of this application.

FIG. 7 is a schematic structural diagram of another network device 700 according to an embodiment of this application. The network device 700 may be configured as the first network device, the second network device or the third network device in the foregoing embodiments, or may be the routing transmission apparatus 400 or the routing transmission apparatus 500 in the foregoing embodiments. The network device 700 includes a main control board 710 and an interface board 730.

The main control board 710 is also referred to as a main processing unit (MPU) or a route processor card. The main control board 710 controls and manages each component in the network device 700, including functions such as route calculation, device management, device maintenance, and protocol processing. The main control board 710 includes a central processing unit 711 and a memory 712.

The interface board 730 is also referred to as a line interface unit card (or line processing unit (LPU)), a line card, or a service board. The interface board 730 is configured to provide various service interfaces and implement data packet forwarding. The service interfaces include but are not limited to an Ethernet interface, a Packet over Synchronous Optical Networking (SONET)/Synchronous Digital Hierarchy (SDH) (POS) interface, and the like. The Ethernet interface is, for example, a flexible Ethernet service interface (or Flexible Ethernet (FlexE) Clients). The interface board 730 includes a central processing unit 731, a network processor 732, a forwarding table entry memory 734, and a physical interface card (PIC) 733.

The central processing unit 731 on the interface board 730 is configured to control and manage the interface board 730 and communicate with the central processing unit 711 on the main control board 710.

The network processor 732 is configured to implement packet forwarding processing. A form of the network processor 732 may be a forwarding chip. Further, processing of an uplink packet includes processing of an inbound interface of the packet, and searching for a forwarding table, and processing of a downlink packet includes searching for a forwarding table, and the like.

The physical interface card 733 is configured to implement an interconnection function at a physical layer, so that original traffic enters the interface board 730 herein, and a processed packet is sent out from the physical interface card 733. The physical interface card 733 includes at least one physical interface. The physical interface is also referred to as a physical interface. The physical interface card 733 corresponds to a FlexE physical interface 204 in a system architecture 200. The physical interface card 733, also referred to as a subcard, may be installed on the interface board 730, and is responsible for converting an optical/electrical signal into a packet, performing validity check on the packet, and forwarding the packet to the network processor 732 for processing. In some embodiments, the central processing unit 731 of the interface board 703 may alternatively perform a function of the network processor 732, for example, implement software forwarding based on a general-purpose CPU, so that the network processor 732 is not required in the physical interface card 733.

Optionally, the network device 700 includes a plurality of interface boards. For example, the network device 700 further includes an interface board 740. The interface board 740 includes a central processing unit 741, a network processor 742, a forwarding table entry memory 744, and a physical interface card 743.

Optionally, the network device 700 further includes a switching board 720. The switching board 720 may also be referred to as a switch fabric unit (SFU). When the network device has a plurality of interface boards 730, the switching board 720 is configured to complete data exchange between the interface boards. For example, the interface board 730 and the interface board 740 may communicate with each other by using the switching board 720.

The main control board 710 and the interface board 730 are coupled. For example, the main control board 710, the interface board 730, the interface board 740, and the switching board 720 are connected to a system backplane by using a system bus to implement interworking. In a possible implementation, an Inter-Process Communication (IPC) protocol channel is established between the main control board 710 and the interface board 730, and communication is performed between the main control board 710 and the interface board 730 by using the IPC channel.

Logically, the network device 700 includes a control plane and a forwarding plane. The control plane includes the main control board 710 and the central processing unit 731, and the forwarding plane includes components, for example, the forwarding table entry memory 734, the physical interface card 733, and the network processor 732, that perform forwarding. The control plane performs functions such as a router, generating a forwarding table, processing signaling and protocol packets, and configuring and maintaining a device status. The control plane delivers the generated forwarding table to the forwarding plane. In the forwarding plane, the network processor 732 searches a table and forwards, based on the forwarding table delivered by the control plane, the packet received by the physical interface card 733. The forwarding table delivered by the control plane may be stored in the forwarding table entry memory 734. In some embodiments, the control plane and the forwarding plane may be completely separated, and are not on a same device.

If the network device 700 is configured as a first network device, the central processing unit 711 may obtain first BGP routing information and determine a forwarding table entry based on the first BGP routing information. The network processor 732 may trigger the physical interface card 733 to send service traffic to a second network device based on the determined forwarding table entry.

If the network device 700 is configured as a second network device, the central processing unit 711 may obtain first BGP routing information. The network processor 732 may trigger the physical interface card 733 to send the first BGP routing information to a first network device.

It should be understood that the receiving unit 401, the sending unit, and the like in the routing transmission apparatus 400 may be equivalent to the physical interface card 733 or the physical interface card 743 in the network device 700. The determining unit 402 or the like in the routing transmission apparatus 400 may be equivalent to the central processing unit 711 or the central processing unit 731 in the network device 700.

It should be understood that an operation on the interface board 740 in this embodiment of this application is the same as an operation on the interface board 730. For brevity, details are not described herein again. It should be understood that the network device 700 in this embodiment may correspond to the first network device or the second network device in the foregoing method embodiment. The main control board 710, the interface board 730, and/or the interface board 740 in the network device 700 may implement functions and/or various steps implemented by the first network device or the second network device in the foregoing method embodiment. For brevity, details are not described herein again.

It should be understood that there may be one or more main control boards, and when there is a plurality of main control boards, an active main control board and a standby main control board may be included. There may be one or more interface boards. A stronger data processing capability of the network device indicates more provided interface boards. There may alternatively be one or more physical interface cards on the interface board. There may be no switching boards, or there may be one or more switching boards. If there are a plurality of switching boards, the switching boards can jointly implement load balancing and redundant backup. In a centralized forwarding architecture, the switching board may be not required in the network device, and the interface board processes service data of the entire system. In a distributed forwarding architecture, a network device may have at least one switching board, and data exchange between a plurality of interface boards is implemented by using the switching board, to provide large-capacity data exchange and processing capabilities. Therefore, data access and processing capabilities of the network device in the distributed architecture are greater than those of the device in the centralized architecture. Optionally, a form of the network device may alternatively be that there is only one board, that is, there is no switching board, and functions of the interface board and the main control board are integrated on the board. In this case, the central processing unit on the interface board and the central processing unit on the main control board may be combined into one central processing unit on the board to perform functions superimposed by the two central processing units. This form of device (for example, a network device such as a low-end switch or a router) has low data exchange and processing capabilities. An architecture to be used depends on a specific networking deployment scenario.

In some possible embodiments, the first network device or the second network device may be implemented as a virtualization device. For example, the virtualization device may be a virtual machine (VM) running a program used to send a packet function, and the virtual machine is deployed on a hardware device (for example, a physical server). The virtual machine is a complete computer system that is simulated by software, has complete hardware system functions, and runs in a completely isolated environment. The virtual machine may be configured as a first network device or a second network device. For example, the first network device or the second network device may be implemented based on a general-purpose physical server in combination with a network functions virtualization (NFV) technology. The first network device or the second network device is a virtual host, a virtual router, or a virtual switch. Persons skilled in the art may virtualize, on a general-purpose physical server by reading this application with reference to the NFV technology, the first network device or the second network device that has the foregoing functions. Details are not described herein again.

It should be understood that the network devices in the foregoing product forms have any function of the first network device or the second network device in the foregoing method embodiment. Details are not described herein again.

An embodiment of this application further provides a chip, including a processor and an interface circuit. The interface circuit is configured to receive instructions and transmit the instructions to the processor. The processor, for example, may be a specific implementation form of the routing transmission apparatus 400 shown in FIG. 4, and may be configured to perform the foregoing packet transmission method. The processor is coupled to a memory, and the memory is configured to store a program or instructions. When the program or the instructions are executed by the processor, the chip system is enabled to implement the method in any one of the foregoing method embodiments.

Optionally, there may be one or more processors in the chip system. The processor may be implemented by hardware or by software. When being implemented by hardware, the processor may be a logic circuit, an integrated circuit, or the like. When being implemented by software, the processor may be a general-purpose processor, and is implemented by reading software code stored in the memory.

Optionally, there may be one or more processors in the chip system. The memory may be integrated with the processor, or may be disposed separately from the processor. This is not limited in this application. For example, the memory may be a non-transitory processor such as a read-only memory (ROM). The memory and the processor may be integrated on a same chip, or may be separately disposed on different chips. A type of the memory and a manner of disposing the memory and the processor are not limited in this application.

For example, the chip system may be an FPGA, an ASIC, a system on chip (SoC), a CPU, an NP, a digital signal processing circuit (or digital signal processor (DSP)), a micro controller unit (MCU), a PLD, or another integrated chip.

An embodiment of this application further provides a computer-readable storage medium, including instructions or a computer program. When the instructions or the computer program is run on a computer, the computer is enabled to perform the routing information transmission method provided in the foregoing embodiments.

An embodiment of this application further provides a computer program product that includes instructions or a computer program. When the computer program product runs on a computer, the computer is enabled to perform the routing information transmission method provided in the foregoing embodiments.

An embodiment of this application further provides a network system. The system includes a first network device and a second network device. The first network device may include the routing transmission apparatus 400, and the second network device may include the routing transmission apparatus 500.

In a specific implementation, the network system may further include a third network device, where the third network device and the second network device may belong to different network domains. For a function performed by the third network device, refer to a specific implementation of the third network device in the embodiment shown in FIG. 2.

In the specification, claims, and accompanying drawings of this application, the terms first, second, third, fourth, and the like (if existent) are intended to distinguish between similar objects but do not necessarily indicate a specific order or sequence. It should be understood that data used in such a way may be interchangeable in appropriate circumstances, so that embodiments described herein can be implemented in an order other than the content illustrated or described herein. In addition, the terms include, have, and any other variants thereof are intended to cover non-exclusive inclusions. For example, a process, method, system, product, or device that includes a series of steps or units is not necessarily limited to those clearly listed steps or units, but may include other steps or units that are not clearly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, unit division is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes various media that can store program code, for example, a Universal Serial Bus (USB) flash drive, a removable hard disk, a ROM, a RAM, a magnetic disk, and an optical disc.

Persons skilled in the art should be aware that in one or more of the foregoing examples, the service described in the present disclosure may be implemented by hardware, software, firmware, or any combination thereof. When being implemented by software, the services may be stored in a computer-readable medium or transmitted as one or more instructions or codes on the computer-readable medium. The computer-readable medium includes a computer storage medium and a communication medium, where the communication medium includes any medium that facilitates transmission of a computer program from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing is merely specific implementations of the present disclosure.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A first network device comprising:
    a transceiver configured to receive, from a second network device, first Border Gateway Protocol (BGP) routing information comprising a service identifier and a first identifier of a first network slice, wherein the first network device is located in the first network slice, and wherein the first network device and the second network device belong to a same network domain; and
    a processor coupled to the transceiver and configured to:

determine, based on the first BGP routing information, a first forwarding table entry to forward, to the second network device using the first network slice, service traffic corresponding to the service identifier; and determine, based on the first identifier and a correspondence, a second identifier of a second network slice, wherein the correspondence is between the first identifier and the second identifier.

2. The first network device of claim 1, wherein the processor is further configured to generate, based on the service identifier and the first identifier, the first forwarding table entry.

3. The first network device of claim 1, wherein the transceiver is further configured to send, to a third network device, second BGP routing information comprising the service identifier and the second identifier to enable the third network device to determine a second forwarding table entry based on the second BGP routing information, wherein the second forwarding table entry enables forwarding the service traffic to the first network device using the second network slice, wherein the third network device and the second network device belong to different network domains, and wherein the third network device is located in the second network slice.

4. The first network device of claim 1, wherein the transceiver is further configured to send the service traffic to the second network device via the first forwarding table entry using the first network slice.

5. The first network device of claim 1, wherein the first forwarding table entry comprises the first identifier.

6. The first network device of claim 1, wherein the service identifier is a virtual private network (VPN) identifier identifying a VPN of a third network device corresponding to a destination address of the service traffic.

7. The first network device of claim 1, wherein the service identifier is a prefix of a third network device corresponding to a destination address of the service traffic.

8. The first network device of claim 1, wherein the first identifier is located in an extended community attribute of the first BGP routing information.

9. A second network device comprising:
a processor configured to obtain first Border Gateway Protocol (BGP) routing information comprising a service identifier and an identifier of a first network slice; and
a transmitter coupled to the processor and configured to send the first BGP routing information to a first network device in the first network slice to enable the first network device to:
forward, to the second network device using the first network slice, service traffic corresponding to the service identifier, wherein the first network device and the second network device belong to a same network domain; and
determine, based on the identifier and a correspondence, a second identifier of a second network slice, wherein the correspondence is between the second identifier and the identifier.

10. The second network device of claim 9, wherein the processor is further configured to generate the first BGP routing information based on the correspondence between the service identifier and the identifier of the first network slice.

11. The second network device of claim 9, wherein the correspondence is configured on the second network device.

12. The second network device of claim 9, wherein the correspondence is based on Interior Gateway Protocol (IGP) routing information.

13. A network system, comprising:
a first network device located in a first network slice, wherein the first network slice comprises a first identifier; and
a second network device coupled to the first network device and configured to:
obtain first Border Gateway Protocol (BGP) routing information, wherein the first BGP routing information comprises a service identifier and the first identifier; and
send the first BGP routing information to the first network device to enable the first network device to forward, to the second network device using the first network slice, service traffic corresponding to the service identifier, wherein the first network device and the second network device belong to a same network domain, wherein the first network device is configured to:
receive the first BGP routing information from the second network device;
determine, based on the first identifier and a correspondence, a second identifier of a second network slice, wherein the correspondence is between the first identifier and the second identifier; and
determine, based on the first BGP routing information, a first forwarding table entry to forward, using the first network slice, the service traffic.

14. The network system of claim 13, wherein the first network device is further configured to generate, based on the service identifier and the first identifier, the first forwarding table entry.

15. The network system of claim 13, wherein the first network device is further configured to:
send, to a third network device, second BGP routing information comprising the service identifier and the second identifier to enable the third network device to determine a second forwarding table entry based on the second BGP routing information, wherein the second forwarding table entry is enabled to forward the service traffic to the first network device using the second network slice, wherein the third network device and the second network device belong to different network domains, and wherein the third network device is located in the second network slice.

16. The network system of claim 13, wherein the first network device is further configured to send, to the second network device via the first forwarding table entry using the first network slice, the service traffic.

17. The network system of claim 13, wherein the first forwarding table entry comprises the first identifier.

18. The network system of claim 13, wherein the service identifier is a virtual private network (VPN) identifier identifying a VPN of a third network device corresponding to a destination address of the service traffic.

19. The network system of claim 13, wherein the service identifier is a prefix of a third network device corresponding to a destination address of the service traffic.

20. The network system of claim 13, wherein the first identifier is located in an extended community attribute of the first BGP routing information.

* * * * *